US007962515B1

(12) United States Patent
McWhirter

(10) Patent No.: US 7,962,515 B1
(45) Date of Patent: Jun. 14, 2011

(54) LOGON ACCESS MANAGEMENT AND CROSS-REFERENCE

(75) Inventor: Stephen J. McWhirter, Hamilton, MA (US)

(73) Assignee: Bank of America Corporation, Charlotte, NC (US)

( * ) Notice: Subject to any disclaimer, the term of this patent is extended or adjusted under 35 U.S.C. 154(b) by 430 days.

(21) Appl. No.: 12/177,426

(22) Filed: Jul. 22, 2008

(51) Int. Cl.
G06F 7/00 (2006.01)
G06F 17/30 (2006.01)

(52) U.S. Cl. ........ 707/781; 707/782; 707/783; 707/785; 726/2; 726/14; 726/16; 380/202; 380/241; 713/155; 713/161; 713/170

(58) Field of Classification Search .................. 707/781, 707/782, 783, 785; 705/18, 50, 56, 58, 72; 726/2, 14, 16, 26, 27; 380/202, 241, 258; 713/155, 161, 170, 182–186
See application file for complete search history.

(56) References Cited

U.S. PATENT DOCUMENTS

| | | | |
|---|---|---|---|
| 6,928,425 B2 * | 8/2005 | Grefenstette et al. | 707/783 |
| 6,947,943 B2 * | 9/2005 | DeAnna et al. | 707/999.1 |
| 7,062,484 B2 * | 6/2006 | Pass | 707/783 |
| 7,069,234 B1 * | 6/2006 | Cornelius et al. | 705/80 |
| 7,725,489 B2 * | 5/2010 | Al-Attas et al. | 707/781 |
| 2003/0023874 A1 * | 1/2003 | Prokupets et al. | 713/201 |
| 2003/0140230 A1 * | 7/2003 | de Jong et al. | 713/182 |
| 2004/0010328 A1 * | 1/2004 | Carson et al. | 707/104.1 |

OTHER PUBLICATIONS

Revett et al.—"Data Mining a keystroke Dynamics Based Biometrics Database Using Rough Sets"—Artificial Intelligence, 2005 Portuguese Conference on Articifial Intelligence, Dec. 5-8, 2005, (pp. 188-191).*
Judy Hill and Mark Misic—"Why You Should Establish a Connection to the Internet"—Techtrends, SringerLink, vol. 41, No. 2, Mar. 1996 (pp. 10-16).*
Rose Heckle, Wayne G. Lutters & David Gurzick—"Network Authentication Using Single Sign-On: The Challenge of Aligning mental Models"—The ACM Guide to Computing Literature, Nov. 2008: CHIMIT'08 Proceedings of the $2^{nd}$ ACM Symposium Management of Information technology, (pp. 1-10).*

* cited by examiner

*Primary Examiner* — Jean B. Fleurantin
*Assistant Examiner* — Anh Ly
(74) *Attorney, Agent, or Firm* — Michael A. Springs; Moore & Van Allen PLLC

(57) ABSTRACT

A system and method for logon access management that includes capturing a logon id and associated user data, the logon id allowing access to at least one of an application or data outside of a entity, automatically searching for a match of at least a portion of the user data with id data inside the entity, and transforming the logon id into a network id when a match is found. The entity may be a company, business, organization, system, or network.

18 Claims, 7 Drawing Sheets

LOGON ACCESS MANAGEMENT AND CROSS-REFERENCE

BACKGROUND OF THE INVENTION

The present invention is related to logon management, and more specifically to logon access management and cross-reference.

In providing products and services to customers, businesses may obtain information related to the customer that is of a sensitive and private nature. For example, a customer that receives services from a financial institution such as a bank may have one or more accounts with the financial institution where the financial institution has sensitive information related to the customer such as name, address, telephone number, social security number, banking account numbers, credit card numbers, etc. This sensitive information may be stored in one or more locations. Further, businesses such as a financial institution may subcontract work or services out to one or more contractors or other entities that may operate outside of the financial institution's normal facilities. These businesses may also have employees that work offsite at vendor locations to provide services to customers of the business. However, a problem exists in that customer information may be at a security risk when applications or data outside of a firewall of the business may be accessed to obtain the sensitive data of the customer. Further, applications running outside of a firewall of the business run a major risk of being misused or breached since they may use logon ids that are not controlled by the business. In addition, vendors, third parties, employees, etc. may have terminated their employment but still may have passwords, access ids, etc. allowing them access to data, information or applications that provide customer sensitive data.

BRIEF SUMMARY OF THE INVENTION

According to one aspect of the present invention, a method for logon access management includes capturing a logon id and associated user data, the logon id allowing access to at least one of an application or data outside of an entity, automatically searching for a match of at least a portion of the user data with id data inside the entity, and transforming the logon id into a network id when a match is found.

According to another aspect of the present invention, a system for logon access management includes a processing device, the processing device being located inside the entity and comprising a processor and a display, a first database, the first database being located inside the entity and being configured to store at least one logon id and associated user data from at least one source outside the entity, the at least one logon id having access to at least one of an application or data outside of the entity, and a second database, the second database being located inside the entity and configured to store at least one network id, the stored at least one network id denoting network ids with valid access to at least one of an application or data, wherein the processor periodically retrieves the at least one logon id and associated user data from the first database, matches at least a portion of the user data with id data in the second database and transforms the logon id into a network id when a compare is found.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION OF THE INVENTION

Figure 1:
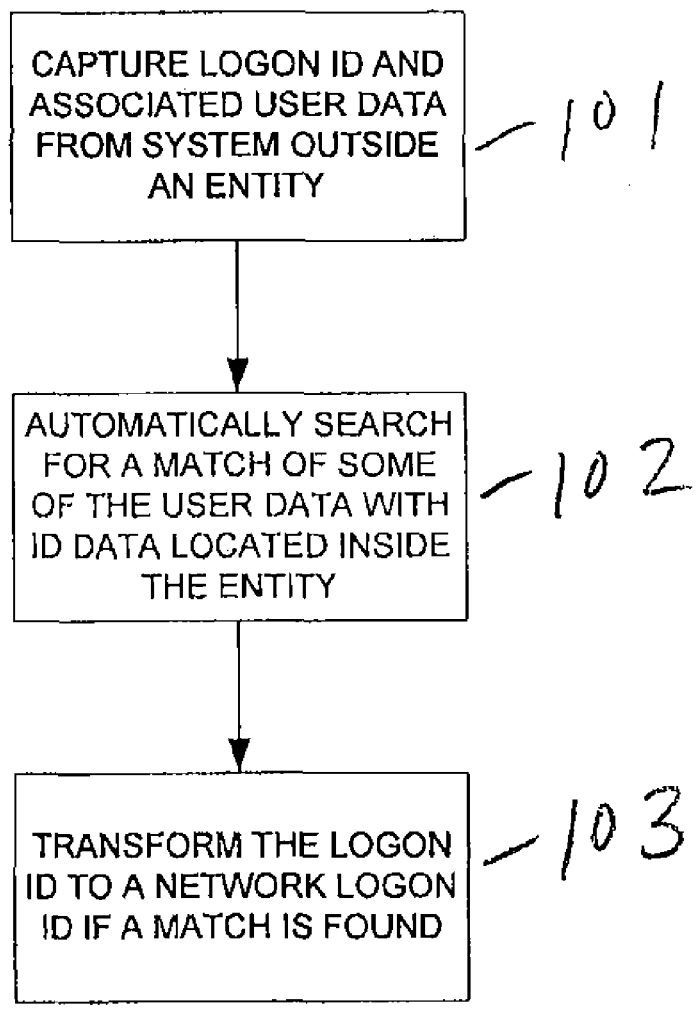
FIG. 1 is a flowchart of a process for logon access management according to an exemplary embodiment of the present invention.

As will be appreciated by one of skill in the art, the present invention may be embodied as a method, system, computer program product, or a combination of the foregoing. Accordingly, the present invention may take the form of an entirely hardware embodiment, or an embodiment combining software (including firmware, resident software, micro code, etc.) and hardware aspects that may generally be referred to herein as a "system." Furthermore, the present invention may take the form of a computer program product on a computer-usable storage medium having computer-usable program code embodied in the medium.

Any suitable computer usable or computer readable medium may be utilized. The computer usable or computer readable medium may be, for example but not limited to, an electronic, magnetic, optical, electromagnetic, or semiconductor system, apparatus, device, or propagation medium. More specific examples (a non-exhaustive list) of the computer readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device. Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer usable or computer readable medium may be any medium that can contain, store, communicate, propagate, or transport the program for use by or in connection with the instruction execution system, platform, apparatus, or device. The computer usable program code may be transmitted using any appropriate medium, including but not limited to the Internet, wireline, optical fiber cable, radio frequency (RF) or other means.

Computer program code for carrying out operations of the present invention may be written in an object oriented, scripted or unscripted programming language such as Java, Perl, Smalltalk, C++ or the like. However, the computer program code for carrying out operations of the present invention may also be written in conventional procedural programming languages, such as the "C" programming language or similar programming languages.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operations to be performed on the computer or other programmable apparatus to produce a computer implemented process such that the instructions which execute on the computer or other programmable apparatus provide steps for implementing the functions/acts specified in the flowchart and/or block diagram block or blocks. Alternatively, computer program implemented steps or acts may be combined with operator or human implemented steps or acts in order to carry out an embodiment of the invention.

According to embodiments of the present invention, applications inside and outside of an entity and/or a firewall of the entity may be monitored to determine if users ids have proper access to sensitive information and data. The entity may be a company, business, organization, system, or network. The monitoring may be performed inside the entity of the business effectively providing protection against a first level of threat where people that have or had control over a company's or business's information that are now separated from the business have their access to the information revoked. This protects clients and customers of the company from their sensitive information being accessed by employees, vendors, etc. that should no longer have access to this information.

Moreover, according to embodiments of the present invention, logon ids may be retrieved and transformed into network ids that are in a format consistent with a desired format. Logon ids that have access to applications and/or data inside and outside of an entity and/or a firewall of an entity may be periodically and automatically retrieved and checked to see if user data associated with the logon id matches any user data that is valid for accessing the particular application and/or data. One or more portions of the user data may be matched against stored data. When one or more portions of the user data associated with a logon id to applications outside of an entity match stored id data inside the entity, the logon id may be transformed to a network id that is in a standard format. Therefore, all logon ids are cross referenced back to a network id allowing for easy monitoring and tracking of logon access by the system or network. If the logon id associated user data does not match with any of the stored id data or known network ids, the logon id may be kicked out of the system and therefore, no longer have access to any applications and/or data of the entity. Therefore, applications and/or sensitive data outside of a entity and/or firewall of an entity are reduced from risk of being misused or breached by former employees, vendors or other people that should no longer have access. This prevents the privacy of customers and clients of the business.

Embodiments according to the present invention provide methods and systems that protect sensitive information, automatically remove a high security threat immediately, prepares network ids in a structure and format that allow for easy passing of potential audits, creates automated tools for reviewing and managing logon ids, network ids and access to applications and/or data, etc. Further, embodiments according to the present invention provide a graphical user interface on a processing device inside the entity that allows monitoring of logon ids that have access to applications and/or data inside and outside of the entity, user data associated with these logon ids, network ids and associated user data, logon ids that have matching network ids, logon ids that do not have a matching network id, and other information related to the logon ids, network ids, associated user data and vendor applications or other applications that reside inside and outside of a entity that have access to information of the entity.

To help illustrate embodiments of the present invention, a financial system will be used as the entity such as, for example, a bank, credit union, etc. However, embodiments according to the present invention are not limited to a financial institution or banking embodiment, as any entity that has logon ids that access applications or data may be included within the scope of the present invention.

FIG. 1 shows a flowchart of a process for logon access management according to an exemplary embodiment of the present invention. In the process 100, in block 101, a logon id and associated user data from systems outside of a business or entity may be captured (e.g., outside a firewall of entity). In block 102, a search for a match of at least a portion of the user data with id data located inside the entity may automatically occur. In block 103, the logon id may be transformed to a network id of the entity if a match is found. The portion of user data may be, for example, a last name, a last name and first name, a last name, first name and middle initial, etc. where these portions may be compared with id data stored inside the firewall. However, the portion of user data does not have to be part of a name but may be other types of information.

Figure 2:
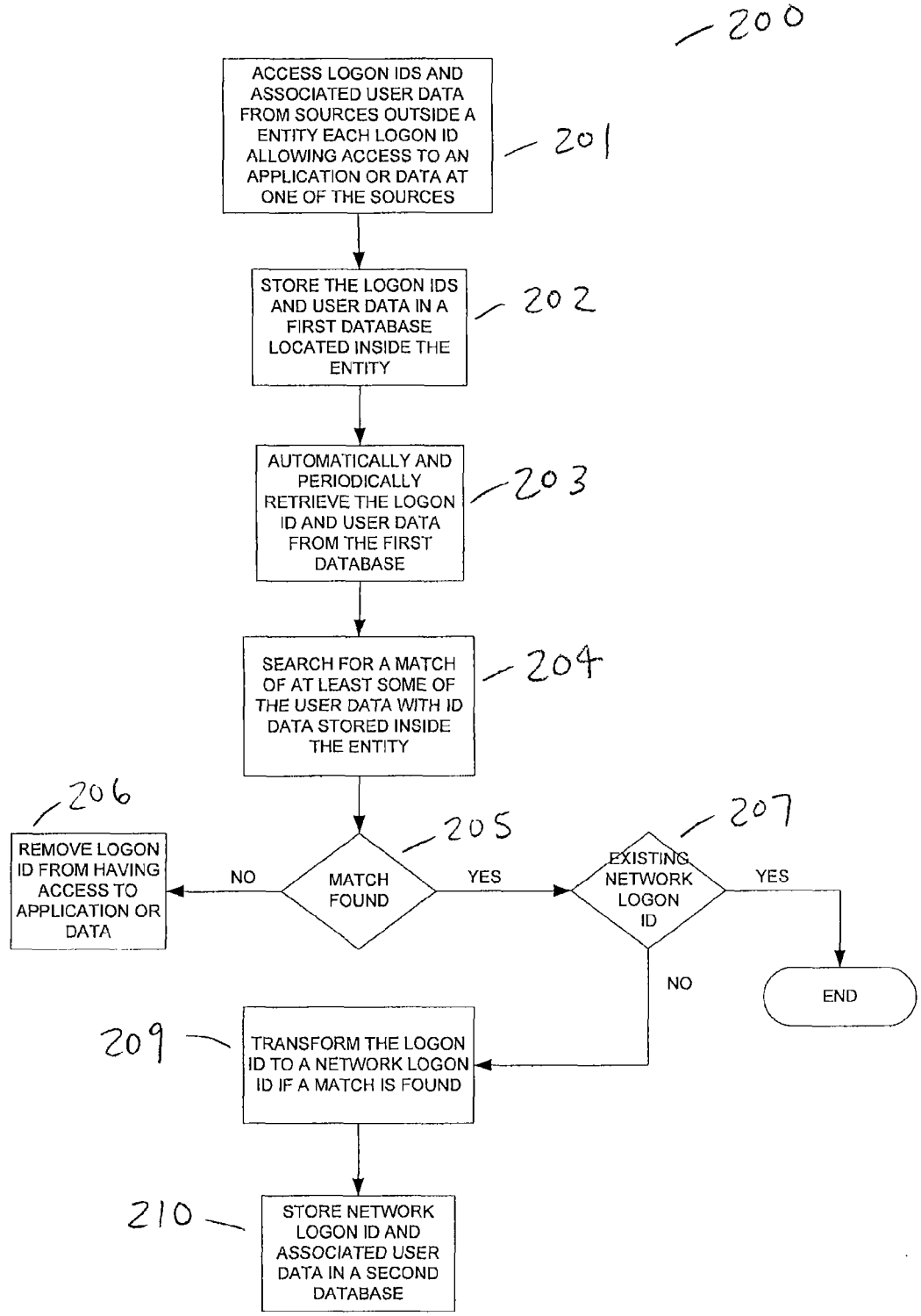
FIG. 2 is a flowchart of a process for logon access management according to another exemplary embodiment of the present invention.

FIG. 2 shows a flowchart of a process for logon access management according to another exemplary embodiment of the present invention. In the process 200, in block 201, logon ids and associated user data may be received from sources outside a firewall of a business or entity where each logon id allows access to an application and/or data. The application and/or data may provide sensitive customer or client information of the business or entity, or sensitive information of the business or entity. In block 202, the received logon ids and user data may be stored in a first database located inside the entity. In block 203, the logon id and user data may be automatically and periodically retrieved from the first database. In block 204, a match of at least some of the user data with id data stored inside the entity may be searched. In block 205, it may be determined if a match is found and if not, in block 206, the logon id having access to the application or data may be removed. If a match is found, in block 207, it may be determined if a network id already exists for the logon id or user data and if so, in block 208 the process ends. If no network id currently exists, then in block 209, the logon id may be transformed into a network id when a match is found. In block 210, the network id and associated user data may be stored in a second database. The second database may be a corporate security database (CSDB) and the first database may be a centralized associate information system (CAIS) database. The logon id and user data may be pulled from the first database automatically on a periodic basis such as, for example, hourly, daily, weekly, etc.

Figure 3:
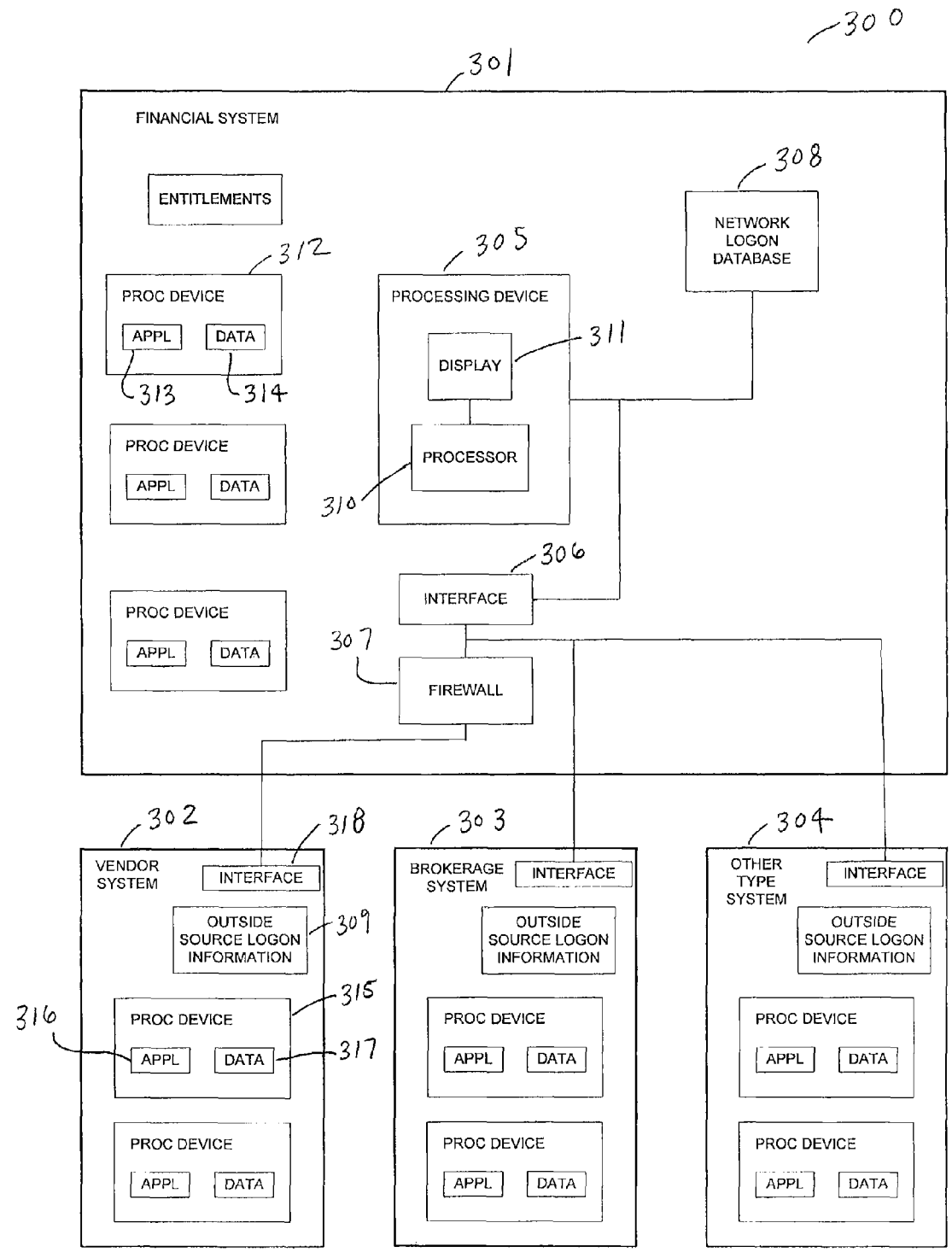
FIG. 3 is a system for logon access management according to an exemplary embodiment of the present invention.

FIG. 3 shows a system for logon access management according to an exemplary embodiment of the present invention. The system 300 may include a financial system 301 that may be interconnected to one or more outside systems 302, 303, 304. The outside systems 302, 303, 304 may be any type of system that may provide or have access to applications and/or data controlled, owned or managed by the financial system 301. For example, the outside systems may be a vendor system 302, a brokerage system 303, or any other type system 304. The financial system 301 may include a processing device 305 that may be interconnected to an interface 306 that provides application access to outside systems 302, 303, 304, a network logon database 308 and a source logon database 309 that may be located outside or inside the firewall. The interface 306 may be connected to a firewall 307 that resides between the financial system 301 and any connections to any outside firewall systems or systems directly connected to the interface 306. The financial system 301 may also include one or more processing devices 312 that run applications 313 or have data 314 that require a network id for access. The processing device 305 may include a processor 310 interconnected to a display 311. The processor 310 may retrieve logon id and user data from the outside source logon information 309, match this with id data stored in the system logon database 308 and either remove or prevent the logon id and user data from access to applications and/or data, or transform the logon id to a network logon id. The network logon id may then be stored in the network logon database 310.

The outside systems 302, 303, 304 may each include an interface 318 that interfaces to the financial system 301 and provides access to logon id information 309. The logon id information 309 may include one or more user ids and associated user data. Each outside system 302, 303, 304 may also include one or more processing devices 315 that may provide access to one or more applications 316 and/or data 317 via a logon id. The application 316 and data 317 may provide access to information, or contain sensitive information, regarding the financial system 301 or customers or clients of the financial system 301. The outside systems 302, 303, 304 may periodically send all logon id information 309 that have access to this sensitive information through the interface 318 and to the interface 306 of the financial system 301. The logon id information 309 may be accessed or sent to the interface 306 from the outside systems 302, 303, 304 either directly or through a firewall 307 of the financial system 301. The logon id and user data may be stored in a database (not shown) that may reside inside the financial system 301, inside the outside source 302, 303, 304, or elsewhere. As noted previously, this logon id and user data may be automatically and periodically monitored by the processing device 305 via retrieval and comparison with id data stored in the network logon database 308. The logon ids and associated user data may also be periodically updated by the processing device 305 or the interface 318 of the outside systems 302, 303, 304 and stored in a database without any action from the outside systems 302, 303, 304. Although the exemplary outside sources here are shown as systems, the outside sources may also be anything that may have access to sensitive information such as, for example, applications, programs, workstations, databases, etc.

Figure 4:
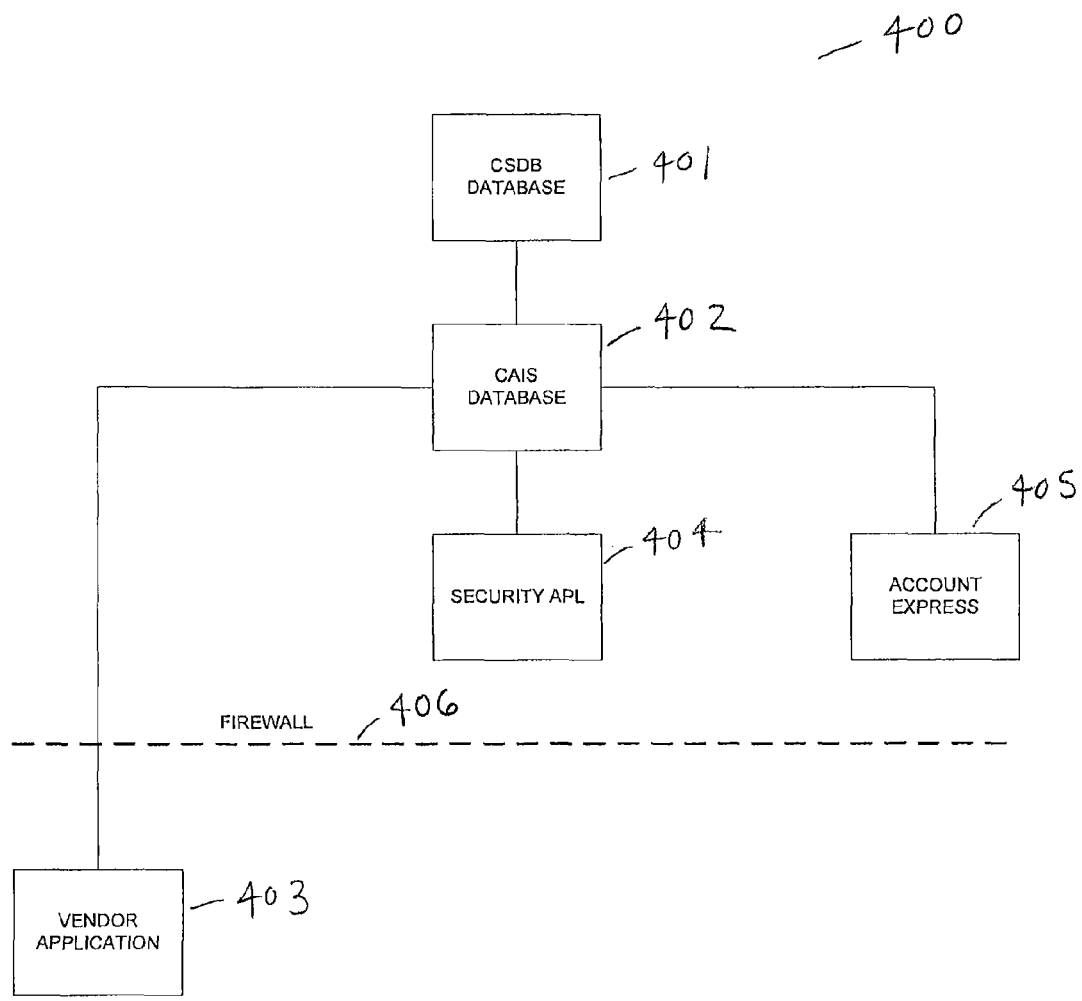
FIG. 4 is a system for logon access management according to another exemplary embodiment of the present invention.

FIG. 4 shows a system for logon access management according to another exemplary embodiment of the present invention. The system 400 may include a corporate security database (CSDB) database 401 that may be interconnected to a centralized associate information system (CAIS) database 402. The CAIS database 402 may be interconnected to one or more outside sources such as a vendor application 403 outside the firewall, a security APL 404 inside the firewall, an account express system 405 inside the firewall, etc. A firewall 406 exists between the CAIS database 402 and some outside sources. Logon ids and associated user data may be provided from the vendor application 403 through the firewall 406 to CAIS, Security APL application 404, and Account Express application 405 to the CAIS database 402 through the vendor device inside the firewall where it may be stored. The user data and logon id may be automatically and periodically retrieved and matched with id data stored in the CSDB database 401.

Figure 5A:
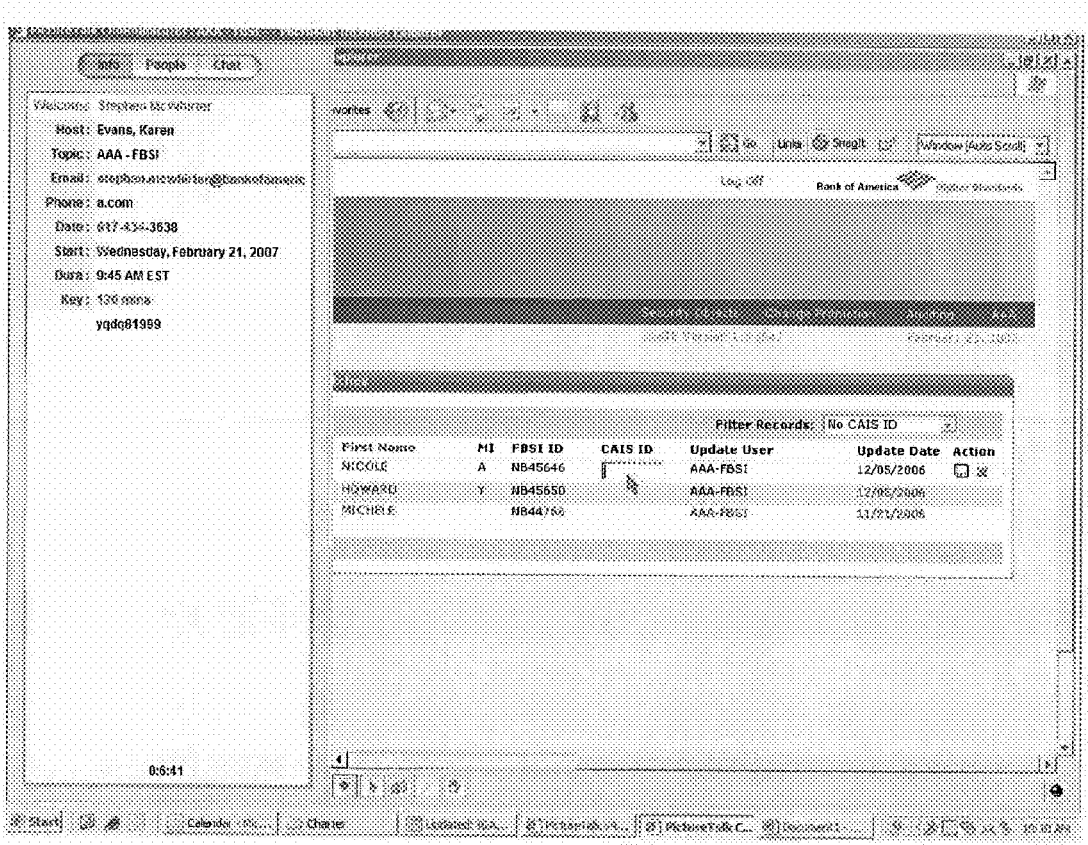
FIGS. 5A-5C are exemplary screen shots according to an exemplary embodiment of the present invention
Figure 5B:
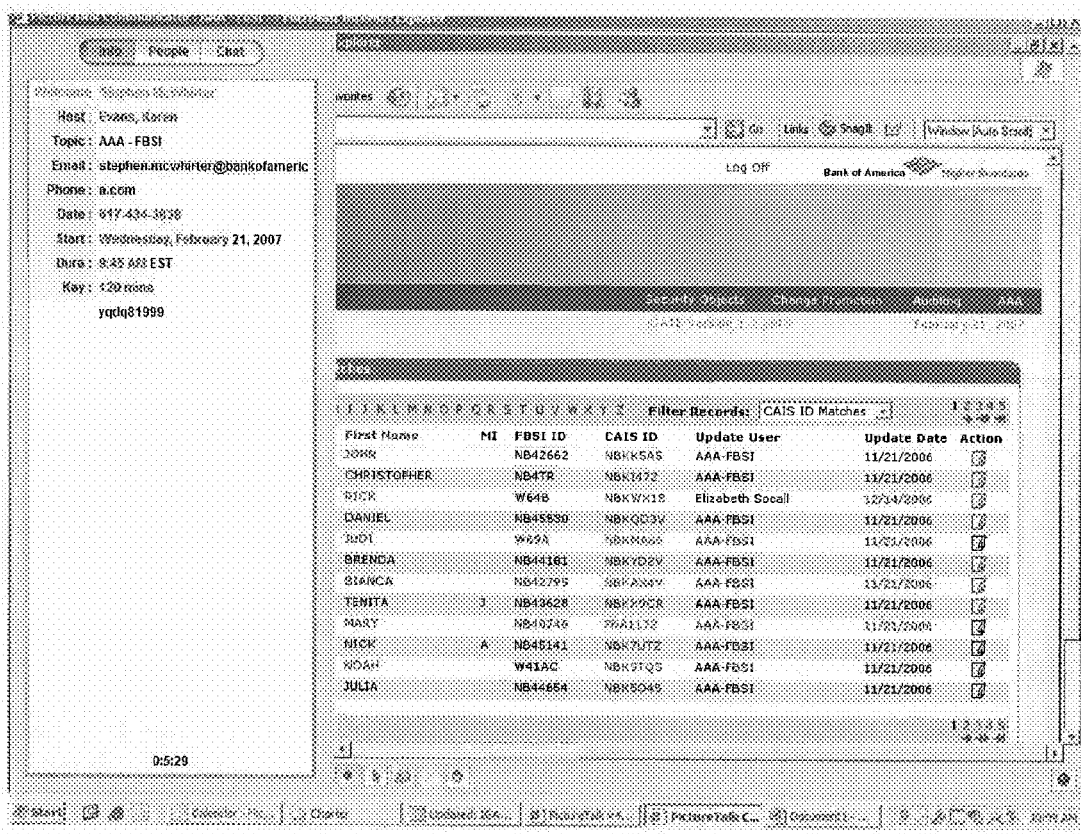
Figure 5C:
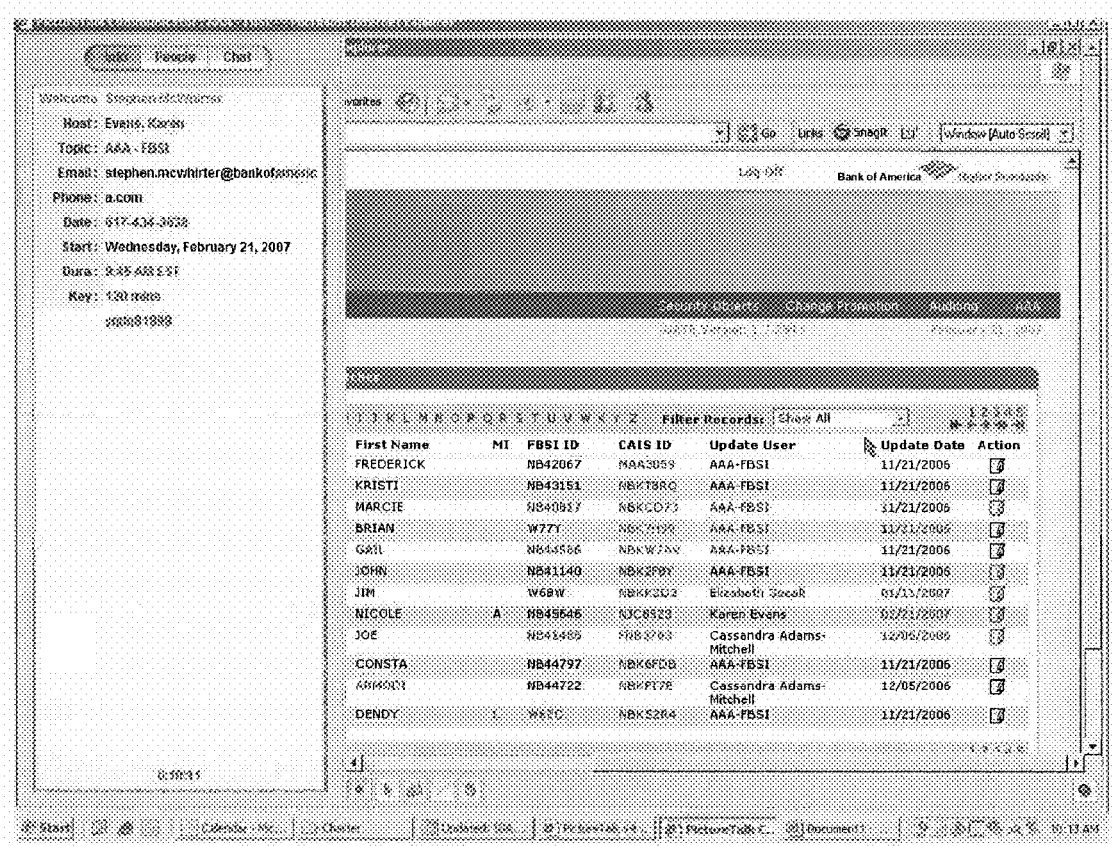
Figure 1:
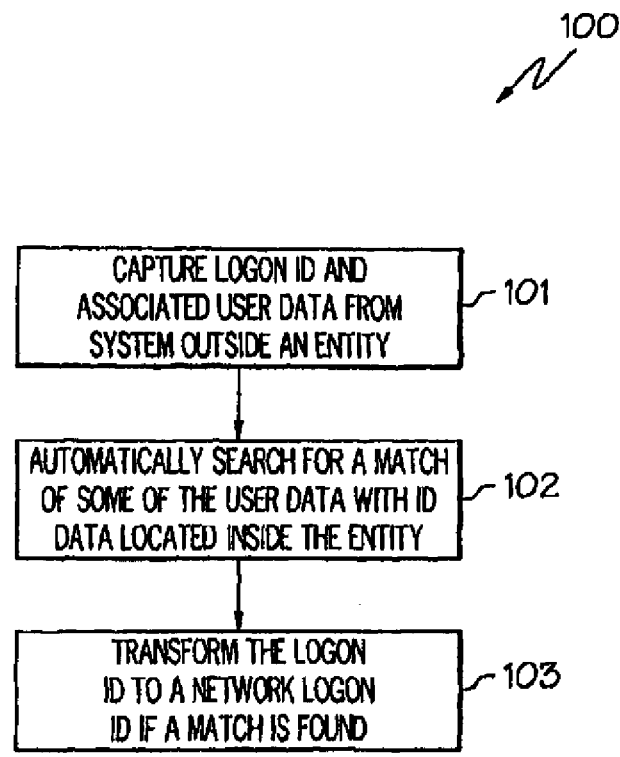
Figure 2:
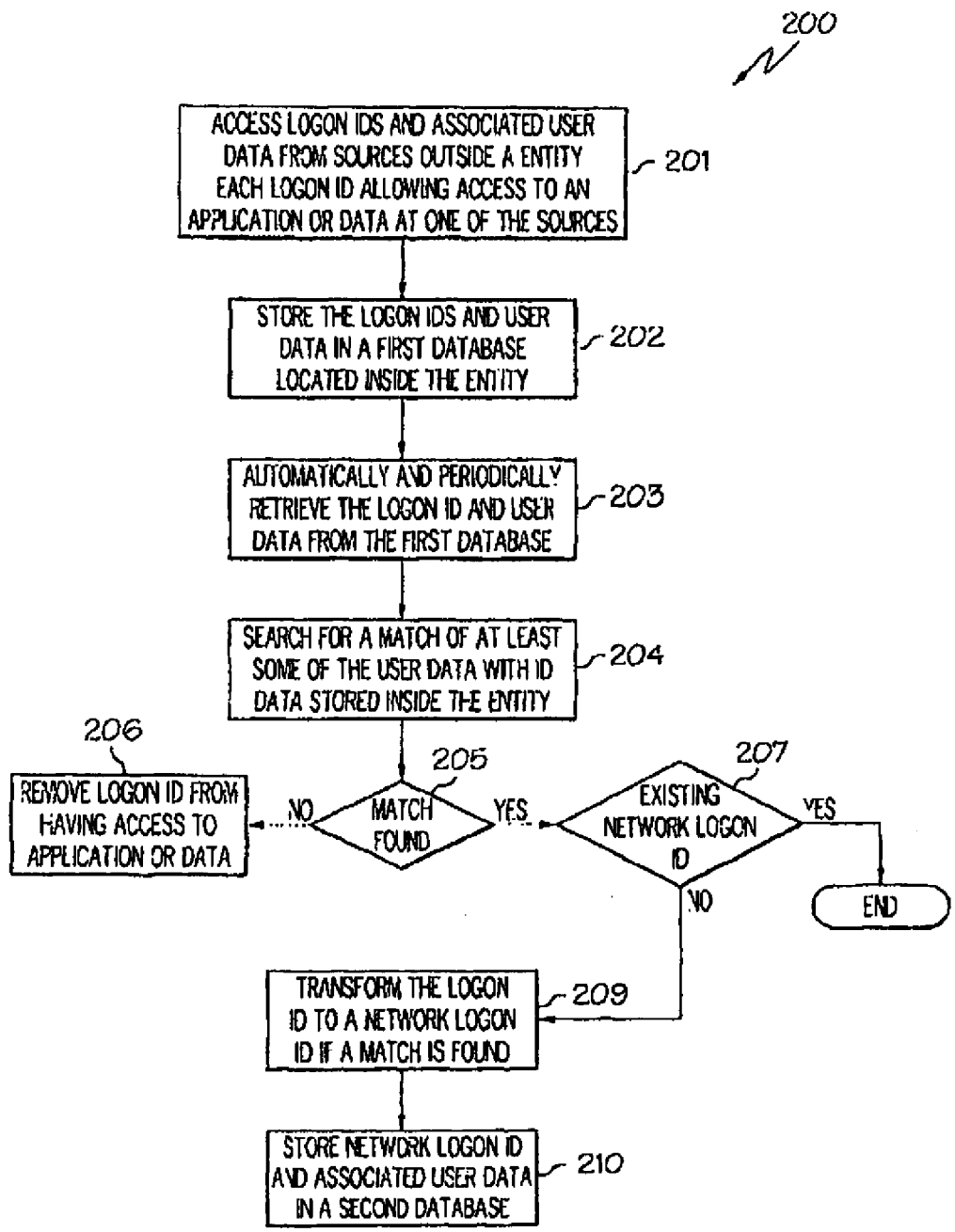
Figure 3:
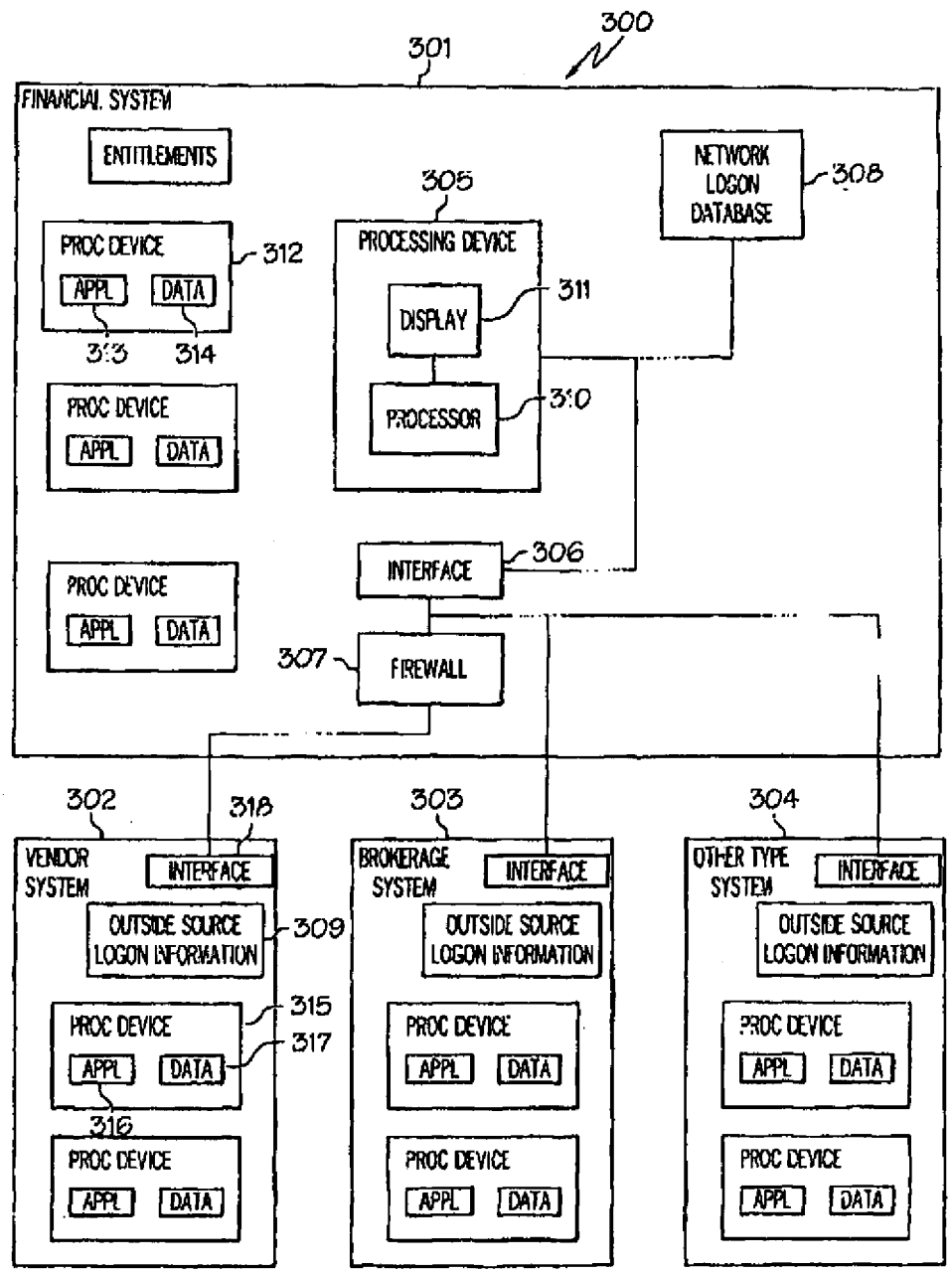
Figure 4:
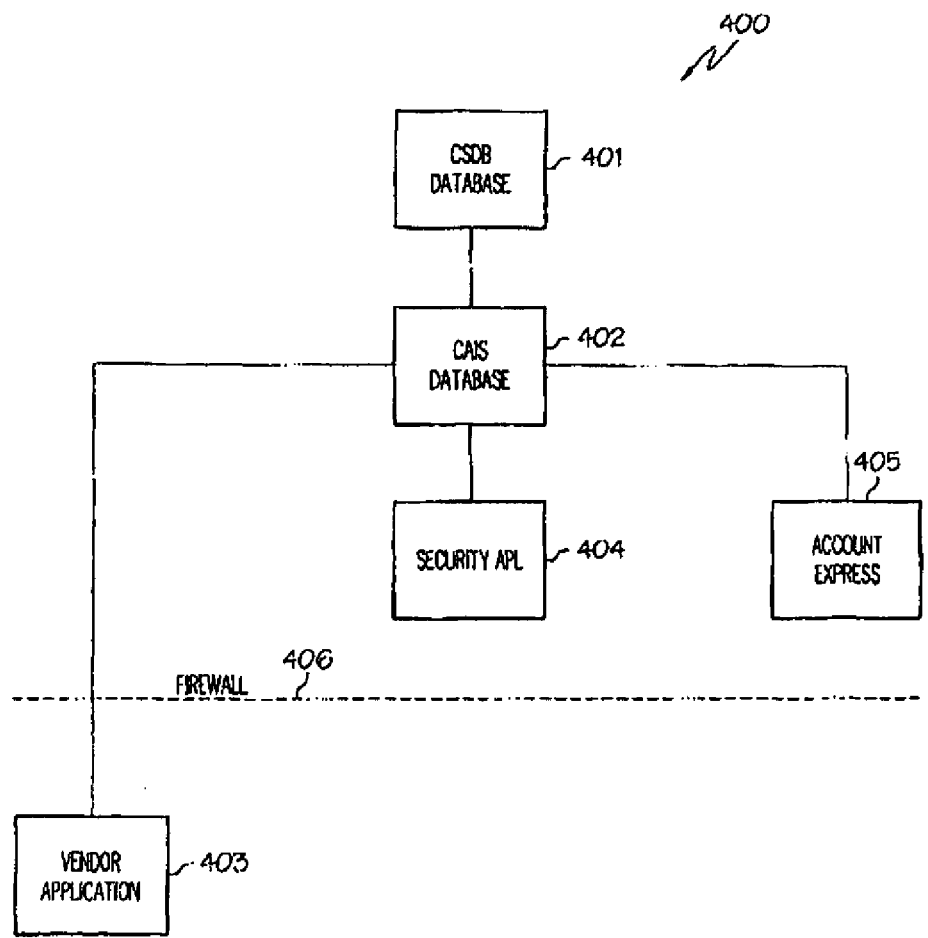
Figure 5B:
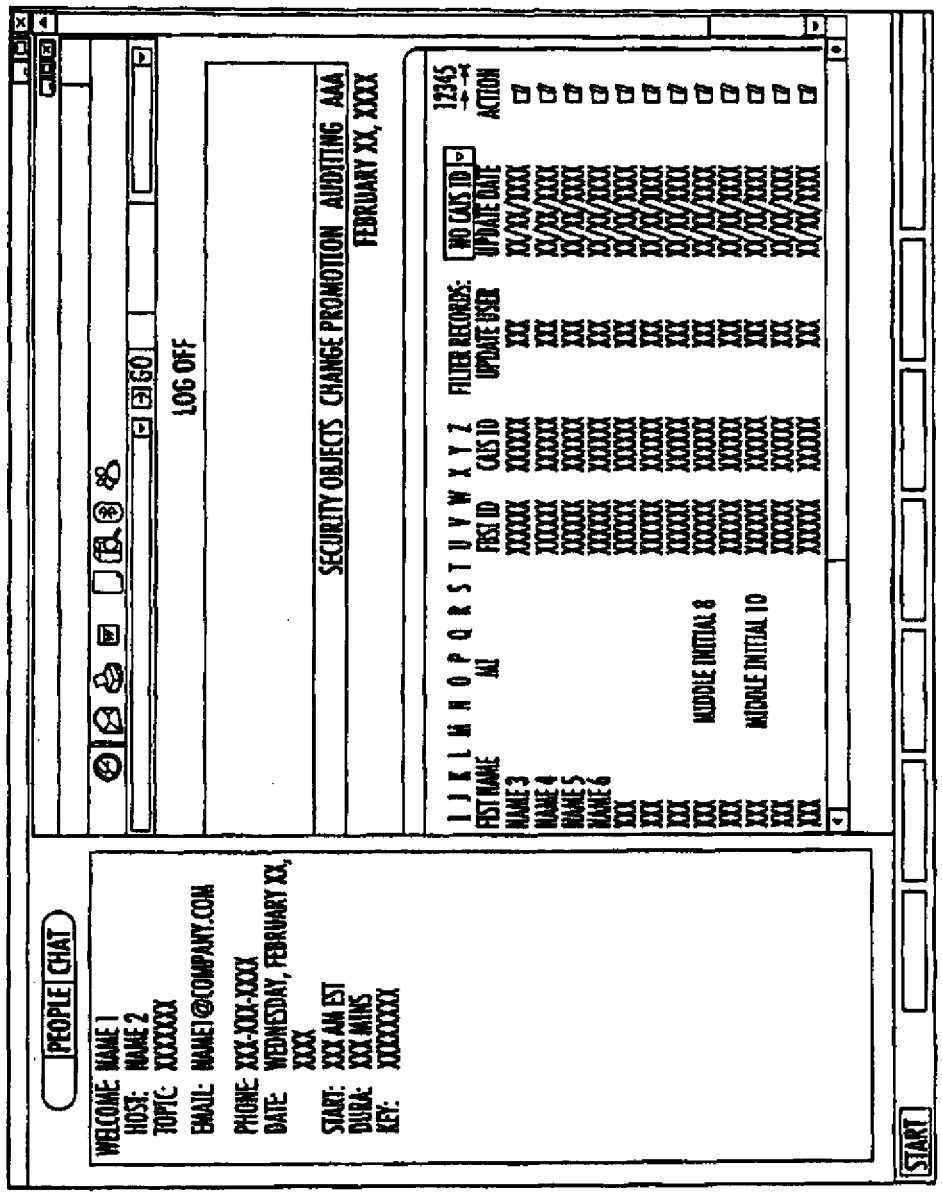
Figure 5C:
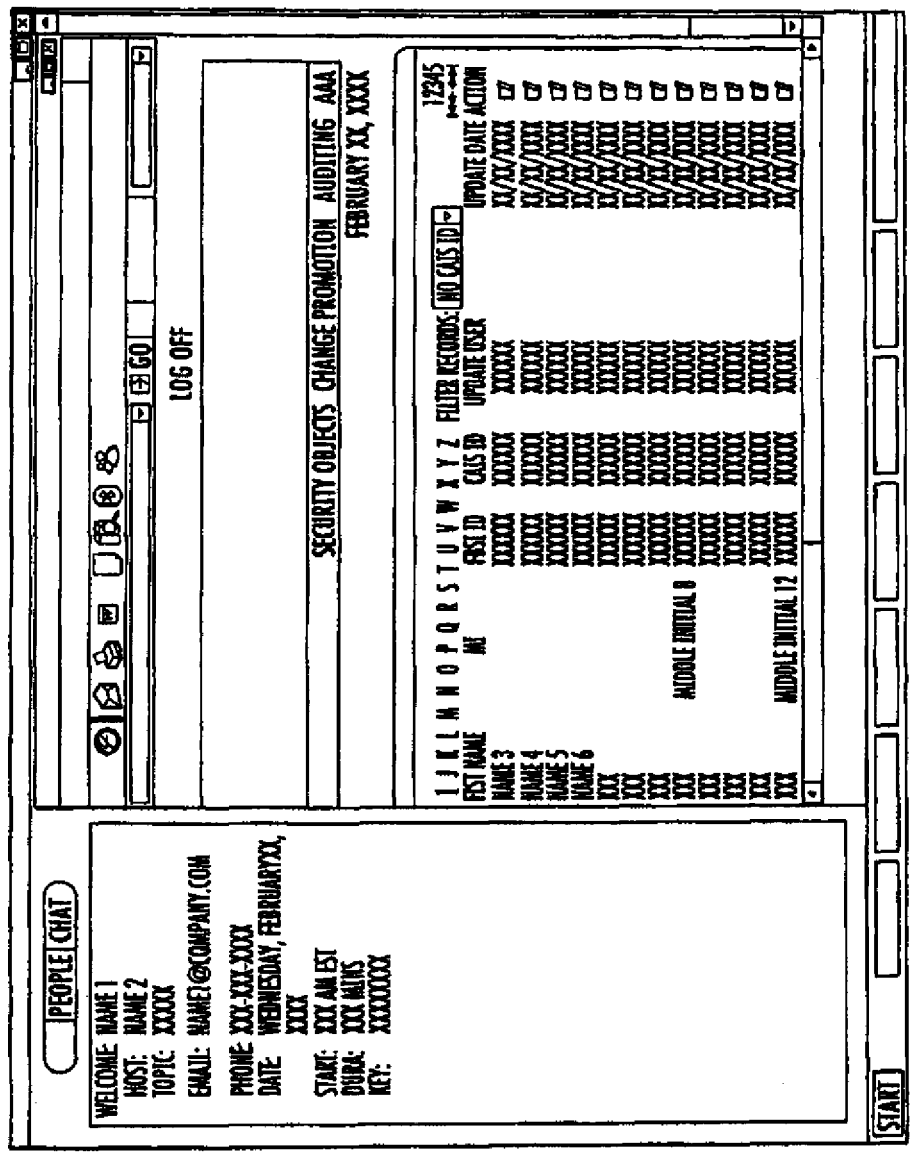

FIGS. 5A-5C show exemplary screen shots according to an exemplary embodiment of the present invention. A processing device may include an application that provides a graphical user interface (GUI) for reviewing and managing logon id and user data from one or more sources outside of a firewall of an entity or business as well as network ids of the business system. For example, FIG. 5A shows a screen shot of first names (portion of the user data), logon id (e.g., FBSI id) where there is no network id (e.g., CAIS id) that matches the user data or the logon id. As shown, the filter records box has been set to show logon ids that have no CAIS (network id) matches. Further, FIG. 5B shows a screen shot of the first name contained in user data and an associated logon id (e.g., FBSI id) where network ids (e.g., CAIS id) have been added. FIG. 5C shows a screen shot where all records are shown where a first name, logon id (e.g., FBSI id), network id (e.g., CAIS id), and other information are shown.

Although not shown, any of various other types of graphical user interface screens where the information is formatted, displayed or otherwise presented in different ways may be included according to embodiments of the present invention. The information such as logon ids, different portions of user data, system ids, outside source names, descriptions, etc. may be present in a spreadsheet or database format where it can be manipulated, sorted, searched and presented in any format desired by the viewer or manager.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method for logon access management comprising:
   capturing, by a computing device processor, a logon id and associated user data, the logon id allowing access to at least one of an application or data outside of an entity;
   automatically searching, by a computing device processor, for a match of at least a portion of the user data with id data inside the entity;
   transforming, by a computing device processor, the logon id into a network id when a match is found;
   monitoring, by a computing device processor, at least one application inside the entity to determine if at least one network id has proper access to specific information;
   removing, by a computing device processor, a network id from having access to the specific information when it is determined that the network id should not have access to the specific information; and
   providing, by a computing device processor, display of a graphical user interface (GUI), the GUI allowing selection of options to view at least one of the logon id, the network id, any logon id that does not match a network id, or any logon id that has a matching network id.

2. The method according to claim 1, wherein automatically searching further comprises matching, by a computing device processor, at least one of a name in the user data with a name in the id data or information other than a name in the user data with information in the id data.

3. The method according to claim 1, wherein automatically searching further comprises searching, by a computing device processor, for a match of the at least a portion of the user data with id data stored inside the entity.

4. The method according to claim 1, wherein capturing further comprises capturing, by a computing device processor, the logon id and user data from outside a entity at a firewall of the entity, data inside the entity being protected from security threats comprising an invalid logon id.

5. The method according to claim 1, further comprising monitoring, by a computing device processor, at least one application outside the entity to determine if at least one logon id has proper access to specific information.

6. The method according to claim 5, further comprising removing, by a computing device processor, a logon id from having access to the specific information when it is determined that the logon id should not have access to the specific information.

7. The method according to claim 5, further comprising monitoring, by a computing device processor, the at least one application outside the entity being performed from inside the entity.

8. The method according to claim 1, further comprising:
   receiving, at computing device, at least one logon id from a plurality of sources periodically; and
   analyzing, by a computing device processor, the at least one logon id to identify at least one of inappropriate access to an application or a potential threat to an application or data.

9. The method according to claim 1, wherein capturing further comprises capturing the logon id and associated user data from a brokerage system located outside of the entity, the logon id having access to at least one of an application or data located outside of the entity.

10. The method according claim 1, wherein capturing further comprises receiving, by a computing device, the logon id and associated user data from a source located outside of the entity, the logon id access having access to at least one of an application or data located outside of the entity.

11. The method according claim 10, a wherein receiving further comprises receiving, by a computing device, the logon id and associated user data from a vendor system located outside of the entity, the logon id access having access to at least one of an application or data located outside of the entity.

12. The method according claim 10, wherein receiving further comprises receiving, by a computing device, the logon id and user data from the source located outside of the entity at a database located inside the entity and storing the received logon id in the database.

13. The method according to claim 12, further comprising periodically retrieving, by a computing device processor, the logon id and associated user data from the database, transforming the logon id from the database into the network id when a match of at least a portion of the user data with id data inside the entity is found, and storing the network id in a second database.

14. A system for logon access management comprising:
   a processing device, the processing device being located inside an entity and comprising a processor and a display;
   a first database, the first database being located inside the entity and being configured to store at least one logon id and associated user data received from at least one source outside the entity, the at least one logon id having access to at least one of an application or data outside of the entity;
   a second database, the second database being located inside the entity and configured to store at least one network id, the stored at least one network id denoting network ids with valid access to at least one of an application or data;
   a graphical user interface (GUI) configured for display on a processing device, wherein the GUI is configured to allow selection of options to view at least one of the at least one logon id, the at least one network id, any logon id that does not match a network id, or any logon id that has a matching network id,
   wherein the processor periodically retrieves the at least one logon id and associated user data from the first database, matches at least a portion of the user data with id data in the second database and transforms the logon id into a network id when a compare is found.

15. The system according to claim 14, wherein the at least one source comprises at least one of a vendor system or a brokerage system.

16. The system according to claim 14, further comprising the processor retrieving the logon id from the first database daily.

17. The system according to claim 14, further comprising the processor revoking any logon id from having access to the at least one of an application or data outside of the entity when a match is not found.

18. The system according to claim 14, wherein the first database comprises a Centralized Associate Information System (CAIS) database and the second database comprises a Corporate Security Data Base (CSDB) database.

* * * * *

UNITED STATES PATENT AND TRADEMARK OFFICE
CERTIFICATE OF CORRECTION

PATENT NO. : 7,962,515 B1  
APPLICATION NO. : 12/177426  
DATED : June 14, 2011  
INVENTOR(S) : McWhirter Page 1 of 14

It is certified that error appears in the above-identified patent and that said Letters Patent is hereby corrected as shown below:

>Please delete patent 7962515 in its entirety and insert patent 7962515 in its entirety as shown on the attached pages.

Signed and Sealed this  
Twenty-third Day of December, 2014

Michelle K. Lee  
*Deputy Director of the United States Patent and Trademark Office*

(12) United States Patent
McWhirter

(10) Patent No.: US 7,962,515 B1
(45) Date of Patent: Jun. 14, 2011

(54) LOGON ACCESS MANAGEMENT AND CROSS-REFERENCE

(75) Inventor: Stephen J. McWhirter, Hamilton, MA (US)

(73) Assignee: Bank of America Corporation, Charlotte, NC (US)

( * ) Notice: Subject to any disclaimer, the term of this patent is extended or adjusted under 35 U.S.C. 154(b) by 430 days.

(21) Appl. No.: 12/177,426

(22) Filed: Jul. 22, 2008

(51) Int. Cl.
G06F 7/00 (2006.01)
G06F 17/30 (2006.01)

(52) U.S. Cl. ........ 707/781; 707/782; 707/783; 707/785; 726/2; 726/14; 726/16; 380/202; 380/241; 713/155; 713/161; 713/170

(58) Field of Classification Search .. 707/781, 782, 783, 785; 705/18, 50, 56, 705/58, 72; 726/2, 14, 16, 26, 27; 380/202, 380/241, 258; 713/155, 161, 170, 182–186
See application file for complete search history.

(56) References Cited

U.S. PATENT DOCUMENTS

| | | | |
|---|---|---|---|
| 6,928,425 B2 * | 8/2005 | Grefenstette et al. | 707/783 |
| 6,947,943 B2 * | 9/2005 | DeAnna et al. | 707/999.1 |
| 7,062,484 B2 * | 6/2006 | Pass | 707/783 |
| 7,069,234 B1 * | 6/2006 | Cornelius et al. | 705/80 |
| 7,725,489 B2 * | 5/2010 | Al-Attas et al. | 707/781 |
| 2003/0023874 A1 * | 1/2003 | Prokupets et al. | 713/201 |
| 2003/0140230 A1 * | 7/2003 | de Jong et al. | 713/182 |
| 2004/0010328 A1 * | 1/2004 | Carson et al. | 707/104.1 |

OTHER PUBLICATIONS

Revett et al.—"Data Mining a keystroke Dynamics Based Biometrics Database Using Rough Sets"—Artificial Intelligence, 2005 Portuguese Conference on Articifial Intelligence, Dec. 5-8, 2005, (pp. 188-191).*
Judy Hill and Mark Misic—"Why You Should Establish a Connection to the Internet"—Techtrends, SringerLink, vol. 41, No. 2, Mar. 1996 (pp. 10-16).*
Rose Heckle, Wayne G. Lutters & David Gurzick—"Network Authentication Using Single Sign-On: The Challenge of Aligning mental Models"—The ACM Guide to Computing Literature, Nov. 2008: CHIMIT'08 Proceedings of the 2nd ACM Symposium Management of Information technology, (pp. 1-10).*

* cited by examiner

Primary Examiner — Jean B. Fleurantin
Assistant Examiner — Anh Ly
(74) Attorney, Agent, or Firm — Michael A. Springs; Moore & Van Allen PLLC

(57) ABSTRACT

A system and method for logon access management that includes capturing a logon id and associated user data, the logon id allowing access to at least one of an application or data outside of a entity, automatically searching for a match of at least a portion of the user data with id data inside the entity, and transforming the logon id into a network id when a match is found. The entity may be a company, business, organization, system, or network.

18 Claims, 7 Drawing Sheets

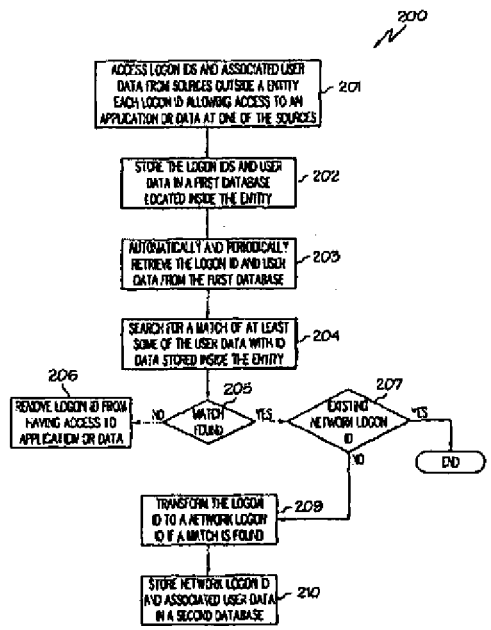

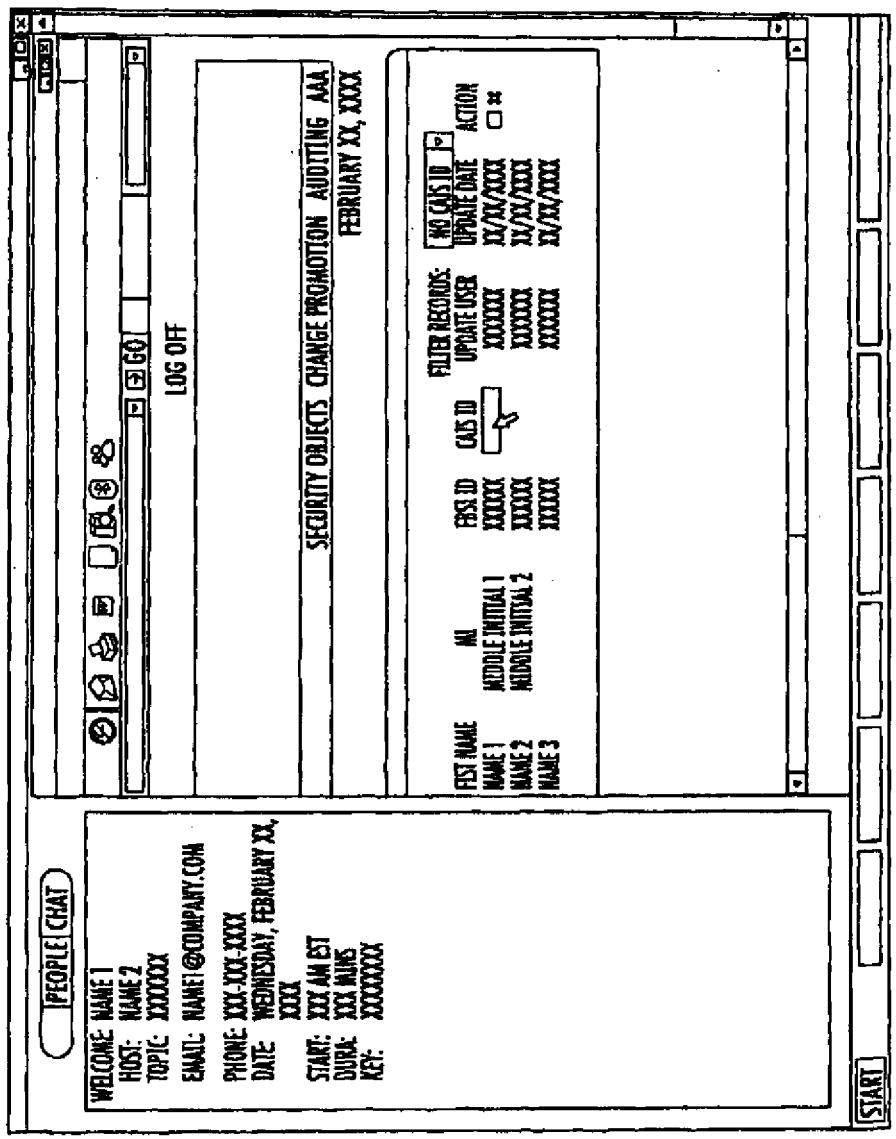

LOGON ACCESS MANAGEMENT AND CROSS-REFERENCE

BACKGROUND OF THE INVENTION

The present invention is related to logon management, and more specifically to logon access management and cross-reference.

In providing products and services to customers, businesses may obtain information related to the customer that is of a sensitive and private nature. For example, a customer that receives services from a financial institution such as a bank may have one or more accounts with the financial institution where the financial institution has sensitive information related to the customer such as name, address, telephone number, social security number, banking account numbers, credit card numbers, etc. This sensitive information may be stored in one or more locations. Further, businesses such as a financial institution may subcontract work or services out to one or more contractors or other entities that may operate outside of the financial institution's normal facilities. These businesses may also have employees that work offsite at vendor locations to provide services to customers of the business. However, a problem exists in that customer information may be at a security risk when applications or data outside of a firewall of the business may be accessed to obtain the sensitive data of the customer. Further, applications running outside of a firewall of the business run a major risk of being misused or breached since they may use logon ids that are not controlled by the business. In addition, vendors, third parties, employees, etc. may have terminated their employment but still may have passwords, access ids, etc. allowing them access to data, information or applications that provide customer sensitive data.

BRIEF SUMMARY OF THE INVENTION

According to one aspect of the present invention, a method for logon access management includes capturing a logon id and associated user data, the logon id allowing access to at least one of an application or data outside of an entity, automatically searching for a match of at least a portion of the user data with id data inside the entity, and transforming the logon id into a network id when a match is found.

According to another aspect of the present invention, a system for logon access management includes a processing device, the processing device being located inside the entity and comprising a processor and a display, a first database, the first database being located inside the entity and being configured to store at least one logon id and associated user data from at least one source outside the entity, the at least one logon id having access to at least one of an application or data outside of the entity, and a second database, the second database being located inside the entity and configured to store at least one network id, the stored at least one network id denoting network ids with valid access to at least one of an application or data, wherein the processor periodically retrieves the at least one logon id and associated user data from the first database, matches at least a portion of the user data with id data in the second database and transforms the logon id into a network id when a compare is found.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein:

FIG. 1 is a flowchart of a process for logon access management according to an exemplary embodiment of the present invention;

FIG. 2 is a flowchart of a process for logon access management according to another exemplary embodiment of the present invention;

FIG. 3 is a system for logon access management according to an exemplary embodiment of the present invention;

FIG. 4 is a system for logon access management according to another exemplary embodiment of the present invention; and FIGS. 5A-5C are exemplary screen shots according to an exemplary embodiment of the present invention

DETAILED DESCRIPTION OF THE INVENTION

As will be appreciated by one of skill in the art, the present invention may be embodied as a method, system, computer program product, or a combination of the foregoing. Accordingly, the present invention may take the form of an entirely hardware embodiment, or an embodiment combining software (including firmware, resident software, micro code, etc.) and hardware aspects that may generally be referred to herein as a "system." Furthermore, the present invention may take the form of a computer program product on a computer-usable storage medium having computer-usable program code embodied in the medium.

Any suitable computer usable or computer readable medium may be utilized. The computer usable or computer readable medium may be, for example but not limited to, an electronic, magnetic, optical, electromagnetic, or semiconductor system, apparatus, device, or propagation medium. More specific examples (a non-exhaustive list) of the computer readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device. Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer usable or computer readable medium may be any medium that can contain, store, communicate, propagate, or transport the program for use by or in connection with the instruction execution system, platform, apparatus, or device. The computer usable program code may be transmitted using any appropriate medium, including but not limited to the Internet, wireline, optical fiber cable, radio frequency (RF) or other means.

Computer program code for carrying out operations of the present invention may be written in an object oriented, scripted or unscripted programming language such as Java, Perl, Smalltalk, C++ or the like. However, the computer program code for carrying out operations of the present invention may also be written in conventional procedural programming languages, such as the "C" programming language or similar programming languages.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operations to be performed on the computer or other programmable apparatus to produce a computer implemented process such that the instructions which execute on the computer or other programmable apparatus provide steps for implementing the functions/acts specified in the flowchart and/or block diagram block or blocks. Alternatively, computer program implemented steps or acts may be combined with operator or human implemented steps or acts in order to carry out an embodiment of the invention.

According to embodiments of the present invention, applications inside and outside of an entity and/or a firewall of the entity may be monitored to determine if users ids have proper access to sensitive information and data. The entity may be a company, business, organization, system, or network. The monitoring may be performed inside the entity of the business effectively providing protection against a first level of threat where people that have or had control over a company's or business's information that are now separated from the business have their access to the information revoked. This protects clients and customers of the company from their sensitive information being accessed by employees, vendors, etc. that should no longer have access to this information.

Moreover, according to embodiments of the present invention, logon ids may be retrieved and transformed into network ids that are in a format consistent with a desired format. Logon ids that have access to applications and/or data inside and outside of an entity and/or a firewall of an entity may be periodically and automatically retrieved and checked to see if user data associated with the logon id matches any user data that is valid for accessing the particular application and/or data. One or more portions of the user data may be matched against stored data. When one or more portions of the user data associated with a logon id to applications outside of an entity match stored id data inside the entity, the logon id may be transformed to a network id that is in a standard format. Therefore, all logon ids are cross referenced back to a network id allowing for easy monitoring and tracking of logon access by the system or network. If the logon id associated user data does not match with any of the stored id data or known network ids, the logon id may be kicked out of the system and therefore, no longer have access to any applications and/or data of the entity. Therefore, applications and/or sensitive data outside of a entity and/or firewall of an entity are reduced from risk of being misused or breached by former employees, vendors or other people that should no longer have access. This prevents the privacy of customers and clients of the business.

Embodiments according to the present invention provide methods and systems that protect sensitive information, automatically remove a high security threat immediately, prepares network ids in a structure and format that allow for easy passing of potential audits, creates automated tools for reviewing and managing logon ids, network ids and access to applications and/or data, etc. Further, embodiments according to the present invention provide a graphical user interface on a processing device inside the entity that allows monitoring of logon ids that have access to applications and/or data inside and outside of the entity, user data associated with these logon ids, network ids and associated user data, logon ids that have matching network ids, logon ids that do not have a matching network id, and other information related to the logon ids, network ids, associated user data and vendor applications or other applications that reside inside and outside of a entity that have access to information of the entity.

To help illustrate embodiments of the present invention, a financial system will be used as the entity such as, for example, a bank, credit union, etc. However, embodiments according to the present invention are not limited to a financial institution or banking embodiment, as any entity that has logon ids that access applications or data may be included within the scope of the present invention.

FIG. 1 shows a flowchart of a process for logon access management according to an exemplary embodiment of the present invention. In the process 100, in block 101, a logon id and associated user data from systems outside of a business or entity may be captured (e.g., outside a firewall of entity). In block 102, a search for a match of at least a portion of the user data with id data located inside the entity may automatically occur. In block 103, the logon id may be transformed to a network id of the entity if a match is found. The portion of user data may be, for example, a last name, a last name and first name, a last name, first name and middle initial, etc. where these portions may be compared with id data stored inside the firewall. However, the portion of user data does not have to be part of a name but may be other types of information.

FIG. 2 shows a flowchart of a process for logon access management according to another exemplary embodiment of the present invention. In the process 200, in block 201, logon ids and associated user data may be received from sources outside a firewall of a business or entity where each logon id allows access to an application and/or data. The application and/or data may provide sensitive customer or client information of the business or entity, or sensitive information of the business or entity. In block 202, the received logon ids and user data may be stored in a first database located inside the entity. In block 203, the logon id and user data may be automatically and periodically retrieved from the first database. In block 204, a match of at least some of the user data with id data stored inside the entity may be searched. In block 205, it may be determined if a match is found and if not, in block 206, the logon id having access to the application or data may be removed. If a match is found, in block 207, it may be determined if a network id already exists for the logon id or user data and if so, in block 208 the process ends. If no network id currently exists, then in block 209, the logon id may be transformed into a network id when a match is found. In block 210, the network id and associated user data may be stored in a second database. The second database may be a corporate security database (CSDB) and the first database may be a centralized associate information system (CAIS) database. The logon id and user data may be pulled from the first database automatically on a periodic basis such as, for example, hourly, daily, weekly, etc.

FIG. 3 shows a system for logon access management according to an exemplary embodiment of the present invention. The system 300 may include a financial system 301 that may be interconnected to one or more outside systems 302, 303, 304. The outside systems 302, 303, 304 may be any type of system that may provide or have access to applications and/or data controlled, owned or managed by the financial system 301. For example, the outside systems may be a vendor system 302, a brokerage system 303, or any other type system 304. The financial system 301 may include a processing device 305 that may be interconnected to an interface 306 that provides application access to outside systems 302, 303, 304, a network logon database 308 and a source logon database 309 that may be located outside or inside the firewall. The interface 306 may be connected to a firewall 307 that resides between the financial system 301 and any connections to any outside firewall systems or systems directly connected to the interface 306. The financial system 301 may also include one or more processing devices 312 that run applications 313 or have data 314 that require a network id for access. The processing device 305 may include a processor 310 interconnected to a display 311. The processor 310 may retrieve logon id and user data from the outside source logon information 309, match this with id data stored in the system logon database 308 and either remove or prevent the logon id and user data from access to applications and/or data, or transform the logon id to a network logon id. The network logon id may then be stored in the network logon database 310.

The outside systems 302, 303, 304 may each include an interface 318 that interfaces to the financial system 301 and provides access to logon id information 309. The logon id information 309 may include one or more user ids and associated user data. Each outside system 302, 303, 304 may also include one or more processing devices 315 that may provide access to one or more applications 316 and/or data 317 via a logon id. The application 316 and data 317 may provide access to information, or contain sensitive information, regarding the financial system 301 or customers or clients of the financial system 301. The outside systems 302, 303, 304 may periodically send all logon id information 309 that have access to this sensitive information through the interface 318 and to the interface 306 of the financial system 301. The logon id information 309 may be accessed or sent to the interface 306 from the outside systems 302, 303, 304 either directly or through a firewall 307 of the financial system 301. The logon id and user data may be stored in a database (not shown) that may reside inside the financial system 301, inside the outside source 302, 303, 304, or elsewhere. As noted previously, this logon id and user data may be automatically and periodically monitored by the processing device 305 via retrieval and comparison with id data stored in the network logon database 308. The logon ids and associated user data may also be periodically updated by the processing device 305 or the interface 318 of the outside systems 302, 303, 304 and stored in a database without any action from the outside systems 302, 303, 304. Although the exemplary outside sources here are shown as systems, the outside sources may also be anything that may have access to sensitive information such as, for example, applications, programs, workstations, databases, etc.

FIG. 4 shows a system for logon access management according to another exemplary embodiment of the present invention. The system 400 may include a corporate security database (CSDB) database 401 that may be interconnected to a centralized associate information system (CAIS) database 402. The CAIS database 402 may be interconnected to one or more outside sources such as a vendor application 403 outside the firewall, a security APL 404 inside the firewall, an account express system 405 inside the firewall, etc. A firewall 406 exists between the CAIS database 402 and some outside sources. Logon ids and associated user data may be provided from the vendor application 403 through the firewall 406 to CAIS, Security APL application 404, and Account Express application 405 to the CAIS database 402 through the vendor device inside the firewall where it may be stored. The user data and logon id may be automatically and periodically retrieved and matched with id data stored in the CSDB database 401.

FIGS. 5A-5C show exemplary screen shots according to an exemplary embodiment of the present invention. A processing device may include an application that provides a graphical user interface (GUI) for reviewing and managing logon id and user data from one or more sources outside of a firewall of an entity or business as well as network ids of the business system. For example, FIG. 5A shows a screen shot of first names (portion of the user data), logon id (e.g., FBSI id) where there is no network id (e.g., CAIS id) that matches the user data or the logon id. As shown, the filter records box has been set to show logon ids that have no CAIS (network id) matches. Further, FIG. 5B shows a screen shot of the first name contained in user data and an associated logon id (e.g., FBSI id) where network ids (e.g., CAIS id) have been added. FIG. 5C shows a screen shot where all records are shown where a first name, logon id (e.g., FBSI id), network id (e.g., CAIS id), and other information are shown.

Although not shown, any of various other types of graphical user interface screens where the information is formatted, displayed or otherwise presented in different ways may be included according to embodiments of the present invention. The information such as logon ids, different portions of user data, system ids, outside source names, descriptions, etc. may be present in a spreadsheet or database format where it can be manipulated, sorted, searched and presented in any format desired by the viewer or manager.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method for logon access management comprising:
  capturing, by a computing device processor, a logon id and associated user data, the logon id allowing access to at least one of an application or data outside of an entity;
  automatically searching, by a computing device processor, for a match of at least a portion of the user data with id data inside the entity;
  transforming, by a computing device processor, the logon id into a network id when a match is found;
  monitoring, by a computing device processor, at least one application inside the entity to determine if at least one network id has proper access to specific information;
  removing, by a computing device processor, a network id from having access to the specific information when it is determined that the network id should not have access to the specific information; and
  providing, by a computing device processor, display of a graphical user interface (GUI), the GUI allowing selection of options to view at least one of the logon id, the network id, any logon id that does not match a network id, or any logon id that has a matching network id.

2. The method according to claim 1, wherein automatically searching further comprises matching, by a computing device processor, at least one of a name in the user data with a name in the id data or information other than a name in the user data with information in the id data.

3. The method according to claim 1, wherein automatically searching further comprises searching, by a computing device processor, for a match of the at least a portion of the user data with id data stored inside the entity.

4. The method according to claim 1, wherein capturing further comprises capturing, by a computing device processor, the logon id and user data from outside a entity at a firewall of the entity, data inside the entity being protected from security threats comprising an invalid logon id.

5. The method according to claim 1, further comprising monitoring, by a computing device processor, at least one application outside the entity to determine if at least one logon id has proper access to specific information.

6. The method according to claim 5, further comprising removing, by a computing device processor, a logon id from having access to the specific information when it is determined that the logon id should not have access to the specific information.

7. The method according to claim 5, further comprising monitoring, by a computing device processor, the at least one application outside the entity being performed from inside the entity.

8. The method according to claim 1, further comprising:
  receiving, at computing device, at least one logon id from a plurality of sources periodically; and
  analyzing, by a computing device processor, the at least one logon id to identify at least one of inappropriate access to an application or a potential threat to an application or data.

9. The method according to claim 1, wherein capturing further comprises capturing the logon id and associated user data from a brokerage system located outside of the entity, the logon id having access to at least one of an application or data located outside of the entity.

10. The method according claim 1, wherein capturing further comprises receiving, by a computing device, the logon id and associated user data from a source located outside of the entity, the logon id access having access to at least one of an application or data located outside of the entity.

11. The method according claim 10, a wherein receiving further comprises receiving, by a computing device, the logon id and associated user data from a vendor system located outside of the entity, the logon id access having access to at least one of an application or data located outside of the entity.

12. The method according claim 10, wherein receiving further comprises receiving, by a computing device, the logon id and user data from the source located outside of the entity at a database located inside the entity and storing the received logon id in the database.

13. The method according to claim 12, further comprising periodically retrieving, by a computing device processor, the logon id and associated user data from the database, transforming the logon id from the database into the network id when a match of at least a portion of the user data with id data inside the entity is found, and storing the network id in a second database.

14. A system for logon access management comprising:
  a processing device, the processing device being located inside an entity and comprising a processor and a display;
  a first database, the first database being located inside the entity and being configured to store at least one logon id and associated user data received from at least one source outside the entity, the at least one logon id having access to at least one of an application or data outside of the entity;
  a second database, the second database being located inside the entity and configured to store at least one network id, the stored at least one network id denoting network ids with valid access to at least one of an application or data;
  a graphical user interface (GUI) configured for display on a processing device, wherein the GUI is configured to allow selection of options to view at least one of the at least one logon id, the at least one network id, any logon id that does not match a network id, or any logon id that has a matching network id,
  wherein the processor periodically retrieves the at least one logon id and associated user data from the first database, matches at least a portion of the user data with id data in the second database and transforms the logon id into a network id when a compare is found.

15. The system according to claim 14, wherein the at least one source comprises at least one of a vendor system or a brokerage system.

16. The system according to claim 14, further comprising the processor retrieving the logon id from the first database daily.

17. The system according to claim 14, further comprising the processor revoking any logon id from having access to the at least one of an application or data outside of the entity when a match is not found.

18. The system according to claim 14, wherein the first database comprises a Centralized Associate Information System (CAIS) database and the second database comprises a Corporate Security Data Base (CSDB) database.

* * * * *